United States Patent [19]
Imura

[11] Patent Number: 5,786,946
[45] Date of Patent: Jul. 28, 1998

[54] ZOOM LENS BARREL INCLUDING IMAGE BLUR SUPPRESSION DEVICE TO SUPPRESS BLUR IN AN OPTICAL IMAGE

[75] Inventor: Yoshio Imura, Kawasaki, Japan

[73] Assignee: Nikon Corporation, Tokyo, Japan

[21] Appl. No.: 711,461

[22] Filed: Sep. 11, 1996

[30] Foreign Application Priority Data

Sep. 14, 1995 [JP] Japan ................. 7-262585

[51] Int. Cl.[6] ................. G02B 15/14; G02B 7/02
[52] U.S. Cl. ................. 359/695; 359/701; 359/704; 359/813; 359/822
[58] Field of Search ................. 359/813, 701, 359/822, 823, 827, 830, 695, 704, 705, 696

[56] References Cited

U.S. PATENT DOCUMENTS

| | | | |
|---|---|---|---|
| 3,748,024 | 7/1973 | Rodier et al. | 359/695 |
| 4,558,927 | 12/1985 | Omori et al. | 359/695 |
| 5,130,851 | 7/1992 | Shirie | 359/695 |
| 5,172,276 | 12/1992 | Ueyama et al. | 359/813 |
| 5,581,404 | 12/1996 | Misaka et al. | 359/557 |
| 5,592,335 | 1/1997 | Omi et al. | 359/695 |
| 5,602,675 | 2/1997 | Okada | 359/554 |
| 5,675,445 | 10/1997 | Uemura et al. | 359/827 |

FOREIGN PATENT DOCUMENTS

| | | |
|---|---|---|
| 3-110529 | 5/1991 | Japan. |
| 7-159605 | 6/1995 | Japan. |

Primary Examiner—Georgia Y. Epps
Assistant Examiner—Evelyn A. Lester

[57] ABSTRACT

A zoom lens barrel includes a device which accurately suppresses image blur through motion compensation while suppressing the rattling of internal components and eliminates the effects from reaction forces arising while driving a motion compensation lens group. The zoom lens barrel includes at least two lens groups which move during zooming and a motion compensation lens group which is driven to compensate for image blurring motion. A mounting device supports the lens barrel in relation to an optical device with a fixed tube attached to the mounting device. A frame body is also affixed in the fixed tube and a drive device which drives the motion compensation lens group is mounted in the frame body.

20 Claims, 3 Drawing Sheets

ZOOM LENS BARREL INCLUDING IMAGE BLUR SUPPRESSION DEVICE TO SUPPRESS BLUR IN AN OPTICAL IMAGE

BACKGROUND OF THE INVENTION

1. Field of the Invention

The present invention relates to a zoom lens barrel having an image blur suppression device to suppress blur in an optical image.

2. Description of the Related Art

Optical systems project an image onto an image plane. Conventional image blur suppression devices suppress, or reduce, blurring of the image. A motion compensation device is a type of image blur suppression device, and compensates for motion incident upon the optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system. Conventional cameras use a motion compensation device to suppress image blur resulting from motion of the camera. Such motion is typically caused by hand tremors of the photographer.

A prior art zoom lens barrel is set forth in Japanese Laid-Open Patent Publication JP-A-3-110529 and includes a device which compensates for an image blurring motion. The device includes a motion compensation lens group which itself moves during zooming or auto focus adjustment.

However, the above prior art zoom lens barrel includes a number of drawbacks including rattle which arises in the lens barrel while driving the motion compensation lens group. In addition, the prior art zoom lens barrel is structured such that the effect of a reaction force within the lens barrel prohibits accurate motion compensation. Accordingly, there is room for improvement in the art.

SUMMARY OF THE INVENTION

It is an object of the invention to overcome the above-mentioned problems.

It is a further object of the invention to provide a zoom lens barrel having an image blur suppression device in which there is no rattling.

It is a further object of the invention to eliminate the effect of a reaction force which arises while driving a motion compensation lens group and to perform accurate motion compensation to reduce image blur.

Objects of the invention are achieved by a zoom lens barrel having an image blur suppression device equipped with two or more lens groups which move while zooming, and an image blurring motion compensation lens group which is driven to compensate for image blurring motion, a mounting device which mounts the lens barrel on an optical device, a fixed tubular body which is fixed in the mounting device, a frame which is fixed in the tubular body, and a drive device which drives the motion compensation lens group supported in the frame.

Objects of the present invention are also achieved by providing a zoom lens barrel which compensates for image blurring motion comprising a mounting device which mounts the zoom lens barrel to an optical device; a fixed tubular body affixed to said mounting device; a frame affixed to said fixed tubular body; two or more lens groups disposed within said fixed tubular body which move to effect a zooming operation; an image blur suppression lens group mounted on said frame and driven to compensate for the image blurring motion; and a drive device which drives said image blur suppression lens group.

Moreover, objects of the invention are achieved by providing a zoom lens barrel including a mount defining an optical axis and attachable to an optical device, comprising a first tube fixed to said mount; a second tube rotating within said first tube to move a first lens group along the optical axis; a third tube engaged with said first tube to non-rotatably move along the optical axis; a drive mechanism supported by said third tube and imparting motion compensating movement to a second lens group disposed along the optical axis; and a fourth tube rotating about said third tube to move a third lens group lens group along the optical axis and thereby focus an optical image.

Objects of the invention are further achieved by a fifth tube connected between said first tube and said third tube, wherein said fifth tube includes a rectilinear groove formed parallel to the optical axis which receives a pin extending from said third tube. The fifth tube is a fixed tube which does not rotate. The third tube linearly moves within said fifth tube, and the third tube linearly moves within said fifth tube. A fifth tube is connected between said first tube and said third tube, wherein said fifth tube includes a rectilinear groove; a focus adjustment ring which is rotatably disposed about said fifth tube; and a focus adjustment arm protruding from said focus adjustment ring and disposed within said rectilinear groove, wherein by rotating said focus adjustment ring, said third lens group focuses the optical image.

Objects of the invention are further achieved by a zoom lens barrel including a camera mount comprising: a first fixed tube defining an optical axis and affixed to said mount; a first rotatable tube rotatable with respect to said first tube about the optical axis; a zoom lens group disposed within said first rotatable tube which moves along the optical axis during rotation of said first rotatable tube; a first movable tube engaged with said first tube to non-rotatably move along the optical axis; a drive mechanism supported by said first movable tube and imparting motion compensating movement to a motion compensation lens group disposed along the optical axis, wherein said drive mechanism does not function during movement of said first movable tube; and a second rotatable tube rotating about said third tube to move a focusing lens group along the optical axis and thereby focus an optical image.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
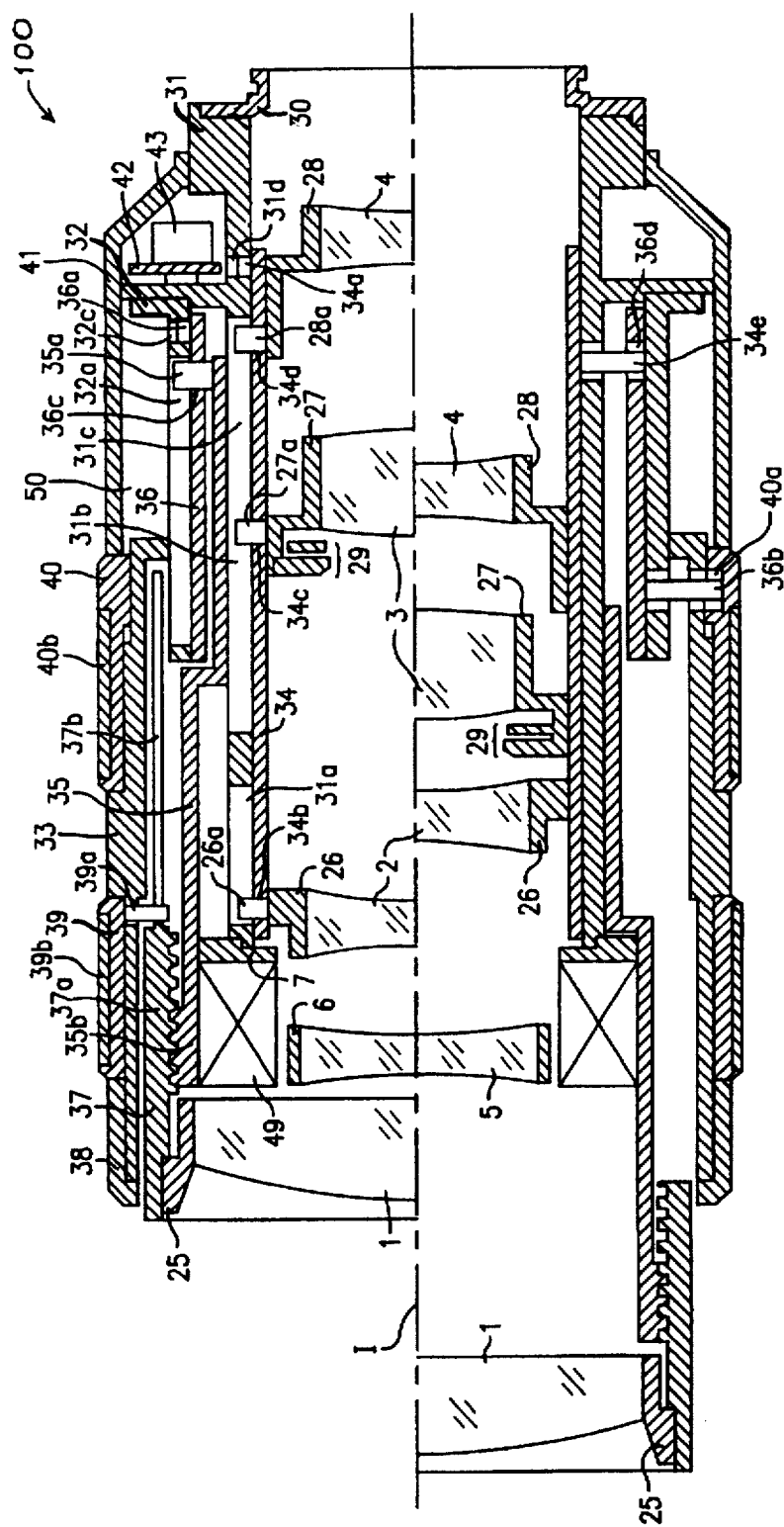
FIG. 1 is a sectional view illustrating a zoom lens barrel having an image blur suppression device according to an embodiment of the present invention.

Reference will now be made in detail to the present preferred embodiments of the present invention, examples of which are illustrated in the accompanying drawings, wherein like reference numerals refer to like elements throughout.

FIG. 1 is a sectional view illustrating a zoom lens barrel having an image blur suppression device according to an embodiment of the present invention. According to a preferred embodiment, the image blur suppression device is a motion compensation device applied to a camera.

In FIG. 1, zoom lens barrel 100 includes five lens groups as follows: first lens group 1, second lens group 5, third lens group 2, fourth lens group 3, and fifth lens group 4. In order to compensate for image blurring motion, second lens group 5 is driven approximately normal to the optical axis I.

Zoom barrel 100 includes two states, namely a Wide (wide angle) state and a Tele (telephoto) state. The Wide state is shown above optical axis I and the Tele state is shown below. When zooming from the Wide position to the Tele position, first lens group 1, fourth lens group 3, and fifth lens group 4 move toward the left-hand side of FIG. 1. Motion compensation lens group 5 does not move while third lens group 2 moves toward the right-hand side of FIG. 1.

The zooming mechanism will next be described. Mount 30 is used to attach lens barrel 100 onto an optical device such as a camera. As illustrated, first fixed tube 31 is generally disposed within the interior of lens barrel 100. Movable tube 35 is generally disposed about an external diameter of first fixed tube 31 and moves in the direction of optical axis I. Second fixed tube 32 is disposed on the outside of first fixed tube 31 such that second fixed tube 32 surrounds first fixed tube 31. First cam tube 36 is rotatably disposed within an internal diameter portion of second fixed tube 32. Pin 36a of first cam tube 36 is engaged in circumferential groove 32c, which is formed in a circumferential direction of second fixed tube 32. Accordingly, only first cam tube 36 is capable of rotation.

Pin 35a of movable tube 35 engages rectilinear groove 32a (formed parallel to the optical axis I of second fixed tube 32) and cam groove 36c of first cam tube 36. Accordingly, by rotating first cam tube 36, movable tube 35 moves in the direction of optical axis I. Movable tube 35 is a non-rotatable tube such that it does not rotate.

Helicoid screw 35b is formed in the front end of movable tube 35 and is geared into helicoid screw 37a of helicoid tube 37. Accordingly, helicoid tube 37 moves integrally with movable tube 35. First lens compartment 25 which firmly supports first lens group 1 is fixed to helicoid tube 37. Frame member 7 is attached to the front end of first fixed tube 31 and supports motion compensation drive mechanism 49, described later.

Second cam tube 34 is rotatably fitted into an internal diameter of first fixed tube 31. Pin 34a of second cam tube 34 engages circumferential groove 31d formed in the circumferential direction of first fixed tube 31. Accordingly, second cam tube 34 is only capable of rotation, not rectilinear motion.

Third lens compartment 26 which firmly supports third lens group 2 is disposed within an internal diameter of second cam tube 34. Pin 26a engages cam groove 34b of second cam tube 34 and rectilinear cam groove 31a of first fixed tube 31.

Fourth lens compartment 27 which firmly supports fourth lens group 3 and aperture mechanism portion 29, is fitted into an internal diameter of second cam tube 34. Pin 27a engages with cam groove 34c of second cam tube 34 and with rectilinear groove 31b of first fixed tube 31.

Fifth lens compartment 28 which firmly supports fifth lens group 4 is fitted into the internal diameter of second cam tube 34. Pin 28a engages with cam groove 34d of second cam tube 34 and with rectilinear groove 31c of first fixed tube 31. Accordingly, through rotation of second cam tube 34, third lens group 2, fourth lens group 3, and fifth lens group 4 respectively move in the direction of optical axis I.

Aperture mechanism portion 29 moves integrally with fourth lens group 3. Zoom actuation ring 40 is rotatably fitted about third fixed tube 33, while third fixed tube 33 is fixed in the internal diameter of second fixed tube 32. Pin 36b of first cam tube 36 engages concavity 40a of zoom actuation ring 40. Pin 36b transmits the rotation of zoom actuation ring 40 to first cam tube 36. Pin 34e of second cam tube 34 engages hole 36d of first cam tube 36. Pin 34e transmits the rotation of first cam tube 36 to second cam tube 34. Accordingly, through rotation of zoom actuation ring 40, respective lens groups 1, 3, 4 and 5 move to effect a zoom operation. At this time, second lens group 5, which is the motion compensation lens group, does not move. Non-slip surface 40b is formed on zoom actuation ring 40.

Next, the focus adjustment mechanism will be described. Focus adjustment ring 39 is rotatably affixed about third fixed tube 33. Arresting ring 38 is an arresting ring of focus adjustment ring 39. Arm 39a of focus adjustment ring 39 engages with groove 37b. Groove 37b is formed parallel to optical axis I of helicoid ring 37. Accordingly, by rotating focus adjustment ring 39, helicoid ring 37 also rotates and first lens group 1 performs a focusing adjustment in the optical axis direction. Non-slip portion 39b is formed on focus adjustment ring 39.

Figure 3:
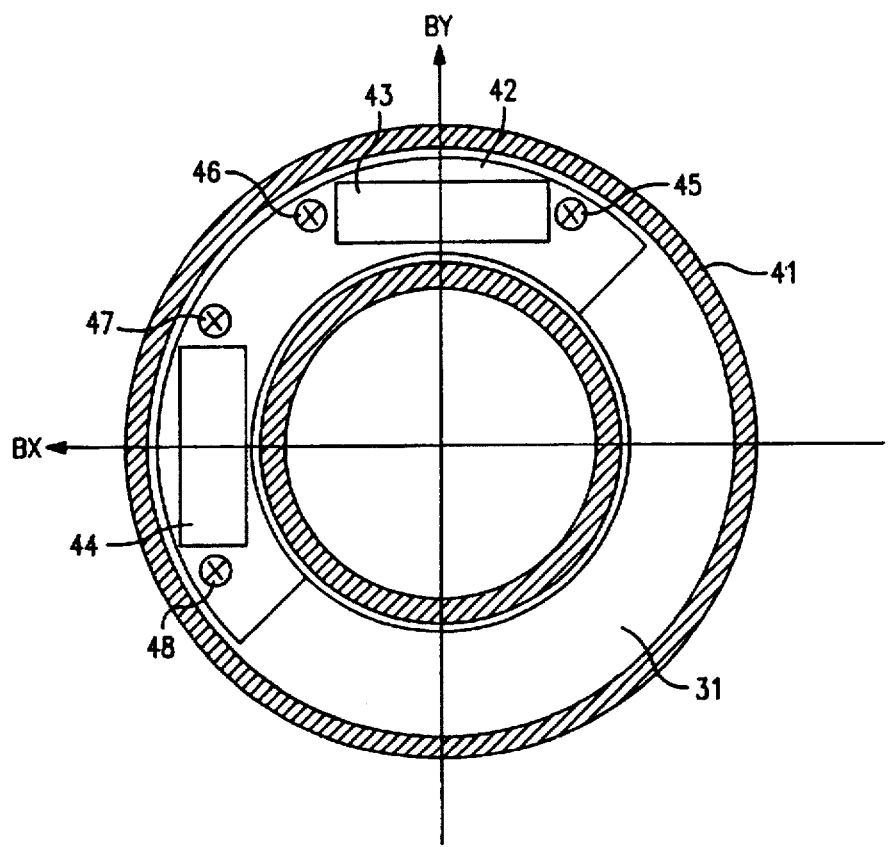
FIG. 3 is a front sectional view illustrating a zoom lens barrel having an image blur suppression device according to an embodiment of the present invention.

In order to compensate for a blurring motion in first fixed tube 31, board 42 is fixed within lens barrel 100 and supports angular velocity sensors 43 and 44 (sensor 44 is shown in FIG. 3). The angular velocity sensors 43 and 44 have been mounted in order to detect the vibration of the entire lens barrel 100. Cover tube 41 surrounds and protects velocity sensors 43 and 44. A control circuit which compensates for a blurring motion (not shown in the drawing) is housed in space 50 between the cover tube 41 and second fixed tube 32.

Figure 2:
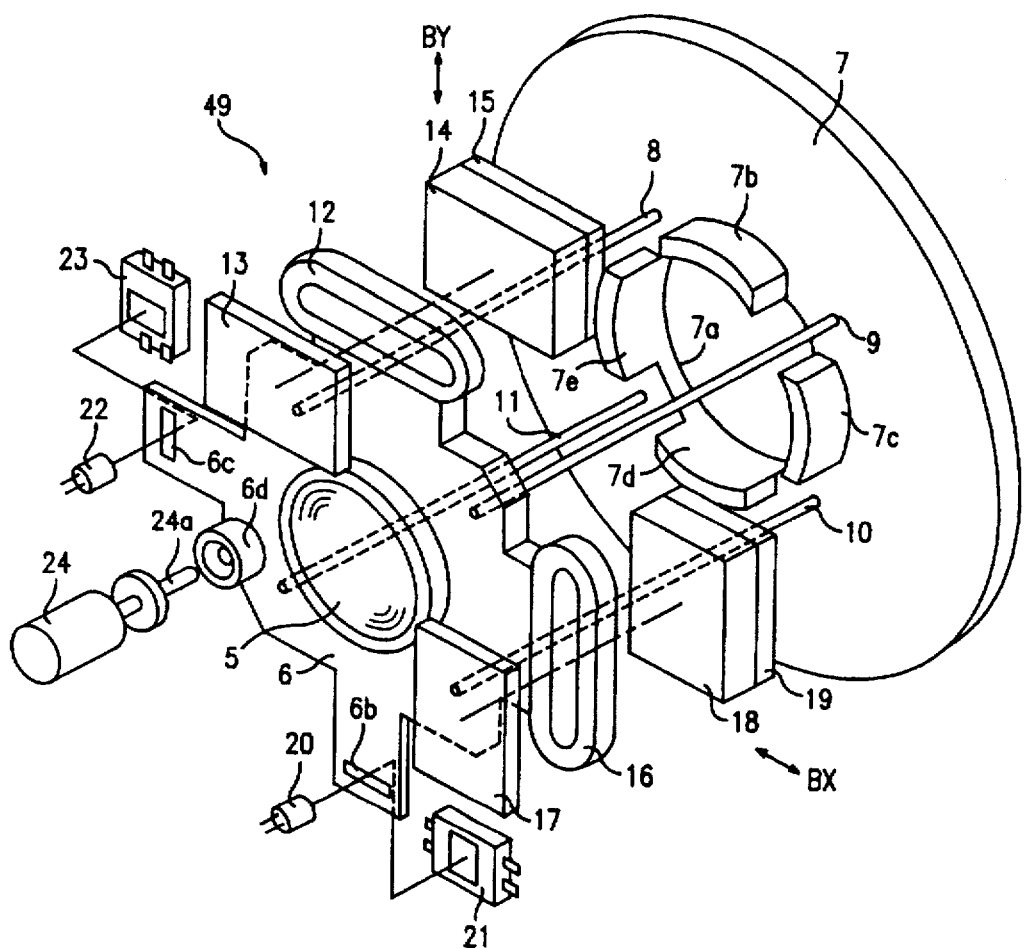
FIG. 2 is a blown apart perspective view illustrating a zoom lens barrel having an image blur suppression device according to an embodiment of the present invention.

FIG. 2 is a blown apart perspective view illustrating drive mechanism 49 which moves motion compensation lens group 5 (the second lens group) perpendicular to optical axis I. As illustrated in FIGS. 1 and 2, motion compensation lens group 5 is fixed to lens frame 6. Wire members 8, 9, 10 and 11 are formed from spring material, with the respective first ends fixed to lens frame 6, and respective second ends fixed to frame member 7. Lens frame 6 is thus capable of movement in any direction of the illustrated BY direction and the illustrated BX direction, with respect to base member 7.

Two coils 12 and 16 are fixed on lens frame 6. Coil 12 is located between yoke 13, permanent magnet 14 and yoke 15. This constitution is a voice coil motor such that coil 12 receives a force in the BY direction when current flows there-through. Coil 12 drives motion compensation lens group 5. Similarly, coil 16 is located between yoke 17, permanent magnet 18 and yoke 19. Coil 16 receives a force in the BX direction and drives motion compensation lens group 5 when current flows there-through.

In order to detect an amount by which motion compensation lens group 5 is driven, two slits, 6b and 6c, are disposed in lens frame 6. LED 20 (light emitting diode) is located on one side of slit 6b, and PSD 21 (photo-sensitive diode) is located on the opposite side. Light emitted from LED 20 reaches PSD 21 through slit 6b. According to a position by which motion compensation lens group 5 has moved, the position of the light reaching the PSD 21 moves, and an output signal of PSD 21 changes. Through this output signal, the position of the motion compensation lens group 5 in the BY direction can be detected.

LED 22 is located on one side of slit 6c, and PSD 23 is located on the opposite side. Light emitted from LED 22 reaches PSD 23 through slit 6c. Similarly, through the output signal of PSD 23, the position of motion compensation lens group 5 in the BX direction can be detected.

Four wall members 7b, 7c, 7d and 7e are disposed around aperture portion 7a in the center of base member 7. Lens frame 6 is located on the inside of the four wall members 7b, 7c, 7d and 7e. Accordingly, the wall members 7b, 7c, 7d and 7e are a structure which mechanically limits the movement of motion compensation lens group 5. In order to lock motion compensation lens group 5, latch solenoid 24 is located opposite to concavity 6d of the lens frame 6. By inserting plunger 24a of latch solenoid 24 into the concavity 6d of the lens frame 6, the motion compensation lens group 5 is locked.

FIG. 3 is a cross sectional diagram illustrating angular velocity sensors 43 and 44 affixed to board 42 for motion compensation (in order to detect vibration of the whole lens barrel). Angular velocity sensor 43 which detects vibration in the BY direction, and angular velocity sensor 44 which detects vibration in the BX direction, are mounted on board 42. Board 42 itself is fixed to first fixed tube 31 by four screws 45, 46, 47 and 48. Filter circuits and amplifier circuits on board 42 may constitute angular velocity sensor processing circuits (not shown in the drawing), for processing the output signals of the angular velocity sensors 43 and 44.

The motion compensation lens group is mounted within the lens barrel and does not move during zooming or focus adjustment. The associated drive mechanism and sensors which detect vibration also do not move during zooming or focus adjustment. In view of the foregoing, the movement direction of the sensors (which detect vibration), and the drive direction of the motion compensation lens group, can be made to accurately coincide. Thereby, accurate image blur suppressing motion compensation can be performed.

In the above manner, through the provision of a zoom lens barrel which has a motion compensation device, because of the provision of the motion compensation lens group 5, the mounting device 30 which mounts the lens barrel in the camera, the fixed tube 31 which is fixed in the mounting device, the frame 7 which is fixed in the fixed tube, the drive device 49 which drives the image blurring motion compensation lens group supported in the frame; and because the image blurring motion compensation lens group 5 and its drive device 49 can be supported without a relationship to zooming, accurate image blurring motion compensation can be performed.

Moreover, because the vibration detection devices 43 and 44 (which detect image blurring motion) have also been fixed in the fixed tube, the direction of vibration detection by the vibration detection devices 43 and 44 and the drive direction of the image blurring motion compensation lens group 5, can be made to accurately coincide. It thereby becomes possible to perform accurate image blur suppressing motion compensation.

The present invention is described in a preferred embodiment as relating to a camera. However, the present invention is not intended to be limited to a camera. For example, the present invention can be used in devices including, but not limited to, camcorders, motion picture cameras, telescopes, binoculars, microscopes, range finding equipment, lasers, fiber optic communication systems, various optical projection systems and CD mastering systems.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A zoom lens barrel which compensates for image blurring motion comprising:

a mounting device to mount the zoom lens barrel to an optical device;

a fixed tubular body affixed to said mounting device;

a frame affixed to said fixed tubular body;

two or more lens groups disposed within said fixed tubular body which move to effect a zooming operation;

an image blur suppression lens group mounted on said frame and driven to compensate for the image blurring motion; and a drive device to drive said image blur suppression lens group.

2. The zoom lens barrel according to claim 1, wherein said image blur suppression lens group is positioned between at least two of said two or more lens groups.

3. The zoom lens barrel according to claim 1, wherein one lens group of said two or more lens groups moves while zooming and a second lens group of said two or more lens groups is a lens group which performs focus adjustment through movement.

4. The zoom lens barrel according to claim 1, further comprising:

a vibration detection device mounted on said fixed tubular body to detect image blurring motion.

5. The zoom lens barrel according to claim 1, wherein said image blur suppression lens group includes a motion compensation device.

6. A zoom lens barrel including a mount defining an optical axis and attachable to an optical device, comprising:

a first tube affixed to said mount;

a second tube rotating within said first tube to move a first lens group along the optical axis;

a third tube engaged with said first tube to nonrotatably move along the optical axis;

a drive mechanism supported by said first tube and imparting motion compensating movement to a second lens group disposed along the optical axis; and a fourth tube rotating about said third tube to move a third lens group along the optical axis and thereby focus an optical image.

7. The zoom lens barrel according to claim 6, further comprising:

a fifth tube connected between said first tube and said third tube, wherein said fifth tube includes a rectilinear groove formed parallel to the optical axis which receives a pin extending from said third tube.

8. The zoom lens barrel according to claim 7, wherein said fifth tube is a fixed tube which does not rotate.

9. The zoom lens barrel according to claim 8, said third tube linearly moves within said fifth tube.

10. The zoom lens barrel according to claim 7, wherein said third tube linearly moves within said fifth tube.

11. The zoom lens barrel according to claim 6, further comprising:
- a fifth tube connected between said first tube and said third tube, wherein said fifth tube includes a rectilinear groove;
- a focus adjustment ring which is rotatably disposed about said fifth tube; and
- a focus adjustment arm protruding from said focus adjustment ring and disposed within said rectilinear groove, wherein by rotating said focus adjustment ring, said third lens group focuses the optical image.

12. The zoom lens barrel according to claim 6, further comprising:
- a fifth tube connected between said first tube and said third tube, wherein said fifth tube includes a rectilinear groove; and
- a sixth tube rotating about said first tube and said third tube, wherein said sixth tube includes a groove which also receives a pin extending from said third tube.

13. The zoom lens barrel according to claim 6, further comprising:
- a fourth lens group which moves along said optical axis in response to rotation of said second tube.

14. The zoom lens barrel according to claim 13, further comprising:
- a fifth lens group disposed between said fourth lens group and said third lens group which moves along said optical axis in response to rotation of said second tube; and
- wherein a distance between said fourth lens group and said fifth lens group changes during rotation of said second tube.

15. The zoom lens barrel according to claim 14, further comprising:
- a sixth lens group disposed between said fifth lens group and said third lens group which moves along said optical axis in response to rotation of said second tube; and
- wherein a distance between said fifth lens group and said sixth lens group changes during rotation of said second tube.

16. A zoom lens barrel including a camera mount, comprising:
- a first fixed tube defining an optical axis and affixed to the camera mount;
- a first rotatable tube rotatable with respect to said first fixed tube about the optical axis;
- a zoom lens group disposed within said first rotatable tube to move along the optical axis during rotation of said first rotatable tube;
- a first movable tube engaged with said first rotatable tube to non-rotatably move along the optical axis;
- a drive mechanism supported by said first fixed tube and imparting motion compensating movement to a motion compensation lens group disposed along the optical axis, wherein said drive mechanism does not function during movement of said first movable tube; and
- a second rotatable tube rotating about said first movable tube to move a focusing lens group along the optical axis and thereby focus an optical image.

17. The zoom lens barrel according to claim 16, further comprising:
- a first member attached to said drive mechanism and moving said motion compensation lens group in a first perpendicular direction with respect to said optical axis; and
- a second member attached to said drive mechanism and moving said motion compensation lens group in a second perpendicular direction with respect to said optical axis.

18. The zoom lens barrel according to claim 17, further comprising:
- a light source transmitting light during operation of said drive mechanism;
- a light restricting structure which restricts a portion of said light transmitted by said light source; and
- a light receiver which receives light transmitted by said light source and restricted by said light restricting structure in response to movement of said motion compensation lens group.

19. The zoom lens barrel according to claim 18, wherein said light receiver outputs a signal for operation of said drive mechanism in response to the received light.

20. The zoom lens barrel according to claim 16, further comprising:
- a second fixed tube connected between said first fixed tube and said first movable tube, wherein said second fixed tube includes a rectilinear groove;
- a focus adjustment ring which is rotatably disposed about said second fixed tube; and
- a focus adjustment arm protruding from said focus adjustment ring and disposed within said rectilinear groove, wherein by rotating said focus adjustment ring, said focus lens group focuses the optical image.

* * * * *